United States Patent [19]
Dallman

[11] Patent Number: 5,733,385
[45] Date of Patent: Mar. 31, 1998

[54] BLADE FOR A FLAIL TYPE BRUSH CUTTING MACHINE

[76] Inventor: Jimmie J. Dallman, 3709 99th Dr. S.E., Issaquah, Wash. 98205

[21] Appl. No.: 671,006

[22] Filed: Jun. 28, 1996

Related U.S. Application Data

[62] Division of Ser. No. 605,653, Feb. 22, 1996, Pat. No. 5,570,571.
[51] Int. Cl.$^6$ ............................................... A01D 50/02
[52] U.S. Cl. ........................................ 148/194; 56/249.5
[58] Field of Search ........................... 266/48; 148/194, 148/196, 200; 56/229; 76/101.1, 104.1

[56] References Cited

U.S. PATENT DOCUMENTS

| | | | |
|---|---|---|---|
| 2,691,262 | 10/1954 | Swertfeger | 55/118 |
| 3,199,609 | 8/1965 | Robinson | 172/45 |
| 3,441,999 | 5/1969 | Perdue et al. | 148/196 |
| 5,570,571 | 11/1996 | Dallman | 56/249.5 |

*Primary Examiner*—Scott Kastler
*Attorney, Agent, or Firm*—Donna J. Thies

[57] ABSTRACT

A blade for a flail type brush cutting machine. The blade is torch cut or cast from thick metal in a generally L shape to have any desired angle between its stem and floor, in the preferred embodiment the angle is ninety degrees to insure a close cut of brush. The thicker metal will cut thicker brush. A resharpenable cutting edge is also torch cut or cast on the floor of the blade making the cutting edge of the blade resharpenable and renewable by repeat torch cutting. An elliptically shaped attaching hole is also torch cut or cast in the stem of the blade for attaching the blade to a hanger to then be attached to the shaft of the flail cutter. This attaching hole can also be torch cut or cast into any desired shape. A method of providing a blade for a flail type brush cutting machine is also disclosed.

11 Claims, 2 Drawing Sheets

BLADE FOR A FLAIL TYPE BRUSH CUTTING MACHINE

This is a division of application Ser. No. 08/605,653 now U.S. Pat. No. 5,570,571 filed Feb. 22, 1996.

BACKGROUND OF THE INVENTION

This invention relates generally to brush cutting machines and more specifically to a blade for a flail type brush cutting machine.

In general, a flail type brush cutting machine is a tractor having a flail cutter attachment attached to the front of the tractor. The flail cutter attachment is generally a shaft member having a plurality of receiving holes on its outside perimeter for receiving a plurality of hangers, a pair of hangers each holding a pair of blades. As the shaft is carried over the ground, the blades slash into the brush to be cut. Typically, in the prior art, the blades used on the flail cutter are an obtuse angled member having a stem; with an attaching hole which attaches to a hanger, and a floor; angled at greater than ninety degrees from the stem, the floor having a cutting edge for cutting brush as the blades are thrust into the brush as the shaft rotates near the ground. Generally, the prior art blades are formed from a relatively thin, flexible metal cut into strips and bent to form the obtuse angle. These thin metal strips have poor integrity due to the forced bend in this relatively thin metal, resulting in excessive breakage of the blades with resultant down time required to change the blades. The prior art blades are not bent to have a full right angle between the stem and the floor of the blade because to do so would reduce the integrity of the blade even more.

U.S. Pat. No. 2,691,262 to Swertfeger discloses a brush clearing machine with flails that are cast. The flail blades are chisel shaped and have an angle other than 90 degrees.

U.S. Pat. No. 2,812,701 to Weaver, Jr. discloses a rotary hoe with teeth that are forged from angled stock.

U.S. Pat. No. 2,938,326 to Lundell discloses a hay chopper having radially positioned members for chopping and gathering hay.

U.S. Pat. No. 3,177,640 to Mott, Jr. discloses a mower blade construction with reversible and resharpenable blades. Elliptical mounting holes are used to attach the blades to a link which attaches to a roller. The blades are bent to form and thus would be vulnerable to breakage.

U.S. Pat. No. 4,259,834 to Lambert et.al. discloses a synchronized flail that uses strengthened flail blades.

U.S. Pat. No. 4,434,642 to Rasmussen discloses a welded replacement grouser bar for an agricultural implement.

U.S. Pat. No. 5,293,734 to Mills discloses a bottom blade for a grass cutting unit which is formed by bending a steel mounting plate to form a lip.

SUMMARY OF THE INVENTION

In order to overcome problems inherent in time prior art there has been devised by the present invention all improved blade for a flail type brush cutting machine. In the present invention, the blade, its attaching hole in the stem for attaching the blade to a hanger, and the cutting edge of the blade are all torch cut from a thicker sheet of metal into any configuration desired. It is also within the spirit and scope of the invention to cast the blade into any desired configuration. In the preferred embodiment of the present invention, the stem of the blade and the floor of the blade are torch cut as a one piece member having a ninety degree angle between them. In this way, a stronger blade is formed having the optimum angle for cutting the brush closely. Thus, without a forced bend in the metal of the blade, there is increased integrity in the blade with less breakage and consequent down time. The blade of the present invention also cuts heavier brush because of its thicker metal and is resharpenable and renewable also because of the thicker metal and the cutting edge formed by the torch cut process. The cutting edge of the present blade can be re-cut with a torch after the cutting edge has dulled, thus reducing replacement costs for dulled blades as well as replacement costs from breakage of the blade. By re-cutting the cutting edge of the blade, any nicks or other flaws that may effect the cutting efficiency of the blade are eliminated. In operation, two blades are attached back to back onto time rotating flail cutter. It is therefore also, within the spirit and scope of the invention to torch cut or cast two or more blades together in a one piece integral unit.

It is therefore an object and advantage of the present blade for a flail type brush cutting machine to provide a blade which cuts brush closely.

It is another object and advantage of the present blade for a flail type brush cutting machine to provide a blade with high integrity and low breakage characteristics.

It is yet another object and advantage of the present blade for a flail type brush cutting machine to provide a blade with a resharpenable and renewable cutting edge to thereby reduce replacement costs, and improve the efficiency of the blade.

It is still yet another object and advantage of the present blade for a flail type brush cutting machine to provide a blade which cuts heavy brush due to its heavier metal composition.

These and other objects and advantages will become apparent with a review of the following drawings and from a study of the specification portion hereinafter describing the preferred embodiments of the invention.

DESCRIPTION OF THE PREFERRED EMBODIMENT

Figure 1:
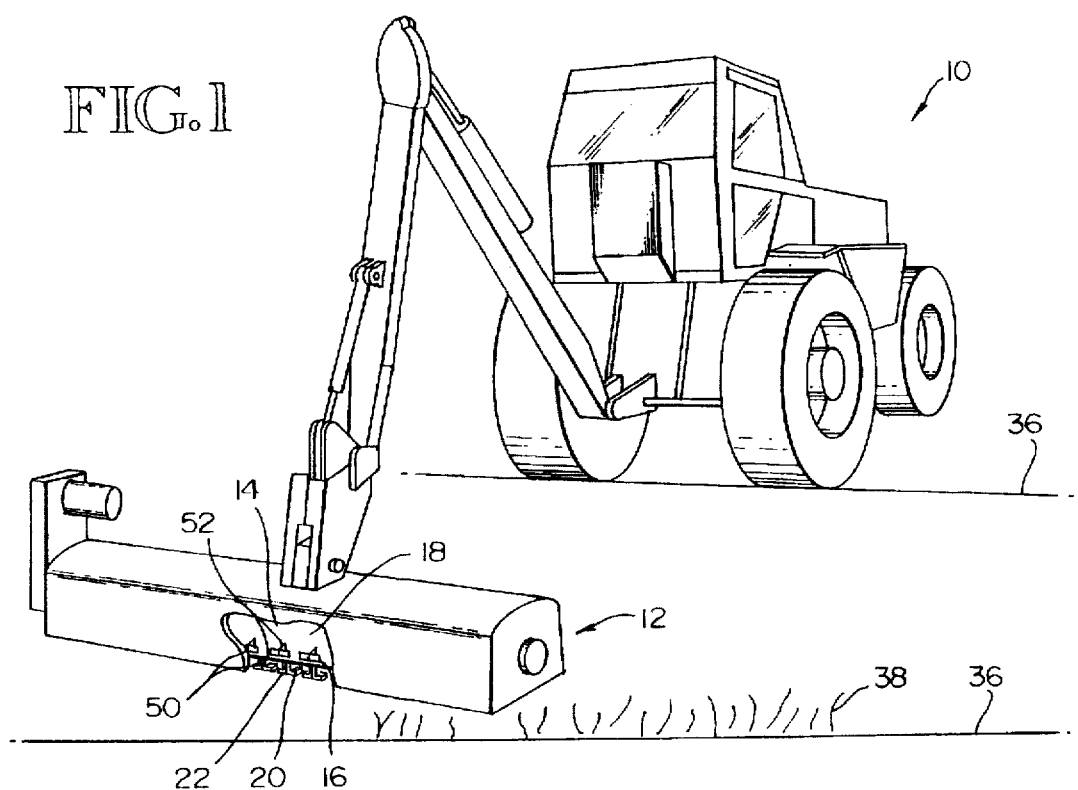
FIG. 1 is a front perspective view showing how the blade of the present invention is positioned on the flail cutter of an existing cutting machine.
Figure 3:
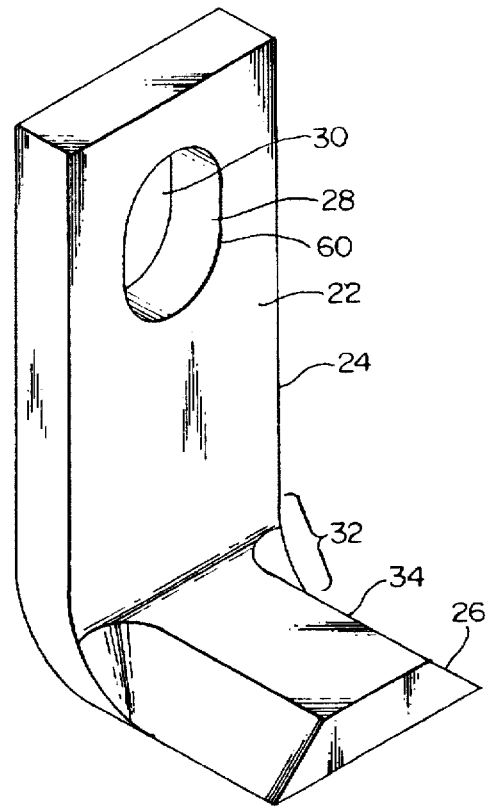
FIG. 3 is a side perspective view of a preferred embodiment of the present invention showing the right angle formed between the stem of the blade and the floor of the blade and showing an elliptical attaching hole in the stem of the blade.

Referring now in general to the drawings and in particular to FIG. 1 of the drawings, there is shown a front perspective view showing how the blade of the present invention is positioned on a conventional flail cutter of an existing brush cutting machine. In FIG. 1 the brush cutting machine is shown generally by the number 10 and the flail cutter is shown generally by the number 12. It can be seen in FIG. 1 that the conventional flail cutter 12 generally comprises a shaft 14 having a plurality of holes 16 positioned through the outer surface 18 of the shaft 14. This plurality of holes 16 holds a plurality of tabs or hangers 20, the hangers 20 in turn each holding blades 22 of the present invention. These hangers 20 are positioned on the shaft 14 in pairs and hold two blades 22 back to back. In FIGS. 1 and 3, it can be seen that the blade 22 of the present invention is a generally L-shaped member comprising a stem 24 and a floor 26, the blades 22 being attached to a hanger 20 by the attaching means 28 in the form of a hole 30 in the stem 24 of the blade 22. In FIG. 1 showing a conventional flail cutter, it can be seen that the hangers 20 are each welded onto the shaft 14 in pairs. The hangers 20 provide a means for attaching the blades 22 to the shaft 14 as will be shown and described in greater detail with reference to FIG. 6. In the preferred embodiment of the present invention, the blade 22 is torch cut such that there is a ninety degree angle 32 between the stem 24 and floor 26 of the blade 22. The floor 26 of the blade 22 carries the cutting edge 34 of the blade 22; thus the floor 26 and the cutting edge 34 of the blade 22 are presented parallel to the ground 36 and the brush 38 to be cut, thereby cutting the brush 38 evenly and close to the ground 36.

Figure 2:
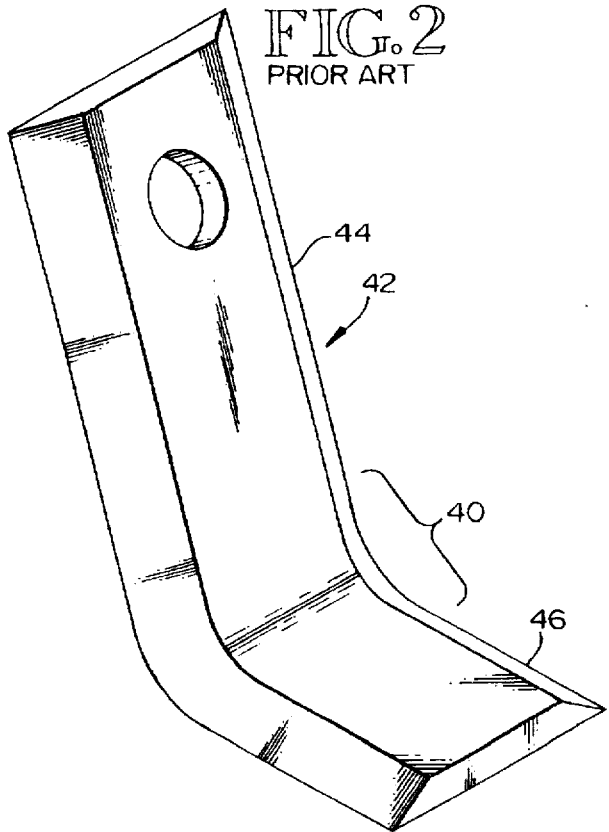
FIG. 2 is a side perspective view of the prior art showing how prior art blades are typically formed to have an obtuse angle formed between the stem of the blade and the floor of the blade.
Figure 4:
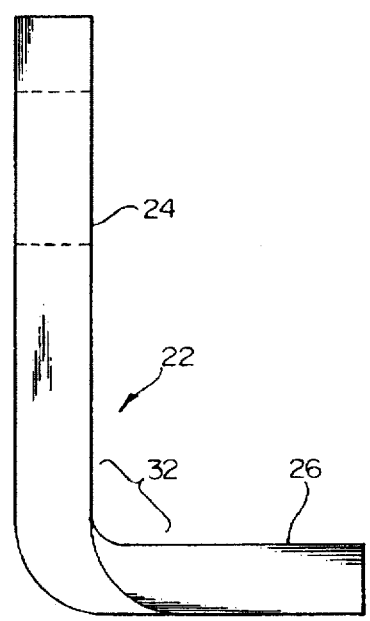
FIG. 4 is a side elevation view of the present invention also showing the right angle formed between the stem of the blade and the floor of the blade.

The advantage of the right angle 32 configuration of the present blade becomes clear when the right angle 32 configuration of the present blade as shown in FIGS. 3 and 4 is compared to the obtuse angle 40 configuration of the prior art blade 42 as shown in FIG. 2. The prior art blade 42 for a flail cutter as shown in FIG. 2 is generally formed by strips cut out of a relatively thin piece of metal. These strips are then bent to form the obtuse angle 40 between the stem 44 and floor 46 of the prior art blade 42. By forcing a bend in the metal, the prior art blade 42 thus lacks integrity and is easily broken or bent entirely out of useable shape upon hitting a rock or other hard object. It can also be seen in FIG. 2 that the prior art blade is bent to have an obtuse angle 40 between its stem 44 and floor 46 since to bend it further into the right angle configuration 32 of the blade 22 of the present invention would only reduce the already poor integrity of the prior art blade 42 even more. Thus, it can be seen that the prior art blade 42 is caused to be angled up and away from the ground 36 and the brush 38 to be cut thereby causing an uneven and not close cut of the brush 38. By contrast, the blade 22 of the present invention is formed by torch cutting the blade 22, cutting edge 34 and attaching hole 30 from a thicker piece of metal. In this way, any desired angle can be cut between the stem 24 and floor 26 of the blade 22; any desired configuration can be formed for the attaching means 28 in the form of an attaching hole 30 in the stem 24 of the blade 22; and any desired cutting edge 34 can be formed. It is also within the spirit and scope of the invention to cast the blade 22, to have any desired angle between the stem 22 and floor 26 of the blade, any desired configuration for the attaching means 28 in the form of an attaching hole 30 in the stem of the blade 22; and any desired cutting edge 34 can also be formed by casting.

Figure 6:
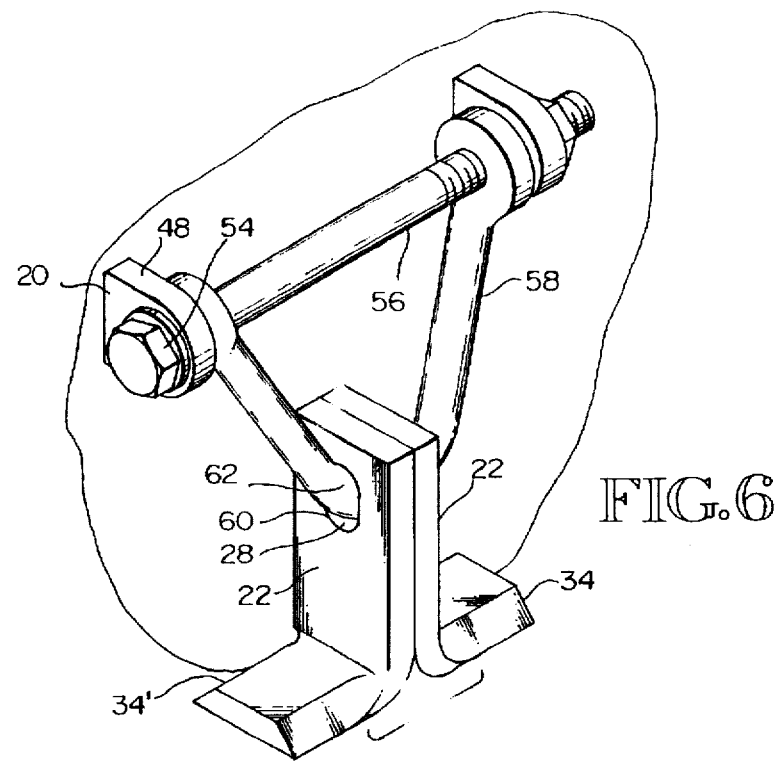
FIG. 6 is a side perspective view showing how the flail blades of the present invention are attached to an existing flail cutter.

Referring now to FIG. 3 of the drawings, there is shown a side perspective view of the present invention. It can be seen in the preferred embodiment of FIG. 3 that a ninety degree angle 32 is formed between the stem 24 and floor 26 of the blade 22 of the present invention. This ninety degree angle 32 is the most beneficial for achieving a close cut of the brush 38. The ninety degree angle 32 cut is therefore preferred for airports, golf courses and the like. It is, however, within the spirit and scope of the invention to have any desired angle between the stem 24 and floor 26 of the blade 22. For example, an angle of greater than ninety degrees can be used to cut heavier brush where a less close cut is desired. The preferred angle of ninety degrees 32 will still cut the heaviest of brush 38, however, and will cut the brush 38 closest to the ground 36. It can be seen further in FIG. 3 that on the floor 26 of the blade 22 there is also torch cut the cutting edge 34 of the blade 22. Because of the torch cut process by which the blade 22 is formed, the cutting edge 34 of the blade 22 can also be cut to any configuration desired. Also, because the cutting edge 34 is torch cut from a thicker metal, the cutting edge 34 of the present flail blade 22 is resharpenable or more specifically completely renewable. By re-torch cutting the blade 22, the cutting edge 34 of the blade 22 becomes completely renewable. In removing part of the material of the cutting edge 34 by torch cutting a new cutting edge, any nicks or other missing chunks of metal in the existing cutting edge 34 are removed. This is an obvious advantage over the prior art which if it is resharpenable, it only resharpens the existing cutting edge with a grinder or other similar means, leaving the cutting edge as it is with all nicks and other cut reducing flaws intact. Renewing the blade 22 of the present invention is accomplished by removing the dull blade 22, again torch cutting a new cutting edge 34 and returning the blade 22 to the flail cutter 12. This represents a distinct advantage over the prior art blade 42 which must be replaced after it is dulled with associated maintenance time and expense. Also seen in FIG. 3 is the attaching means 28 in the form of an attaching hole 30 on the stem 24 of the blade 22 for attaching the blade 22 onto a hanger 20 which in turn attaches to the shaft 14 of the flail cutter 12 as seen in FIG. 1. There are a plurality of hangers 20 welded to the shaft 14. These hangers 20 are positioned on the shaft 14 in pairs and each pair of hangers 48 holds two blades 22 back to back, so that each of the two blades 22 can, be reversed, to present a new cutting edge 34'. These pairs of hangers 48 are spaced an equal distance apart between rows 50 and are staggered intermittently as between columns 52. Each pair of hangers 48 has a hole 54 therethrough for receiving a bolt 56 which in turn is inserted through a C-ring 58 and the pair of hangers 48 as seen in FIG. 6. The C-rings 58 each carry a pair of blades 22 positioned back to back. In the preferred embodiment of the present invention, the attaching means 28 in the form of an attaching hole 30 in the blade 22 for attaching the blade 22 to the C-ring 58 is an elliptical shape 60 to provide more room for the blade 22 to slide on the ring portion 62 of the hanger 20. An elliptical shape 60 for the attaching hole 30 which attaches the blade 22 to the flail cutter 12, allows the blade 22 to swing back and forth more readily as it swings by the brush 38 to be cut. With more movement of the blade 22 accomplished in this way a more certain cut of the brush 38 is assured. Since the attaching hole 30 part of the blade 22 is also torch cut, it too can be cut to any shape desired. It is therefore, also within the spirit and scope of the invention to form the attaching hole 30 into any desired shape. For example, a round hole 63 would be used to accomodate existing flail cutters 12 that use a round attaching hole 63 for attaching the blade 22 to the hanger 20 as seen in FIG. 7. Since, in operation, the blades 22 are positioned back to back in pairs it is also within the spirit and scope of the invention to torch cut or cast two or more blades 22 together in a one piece integral unit.

Figure 5:
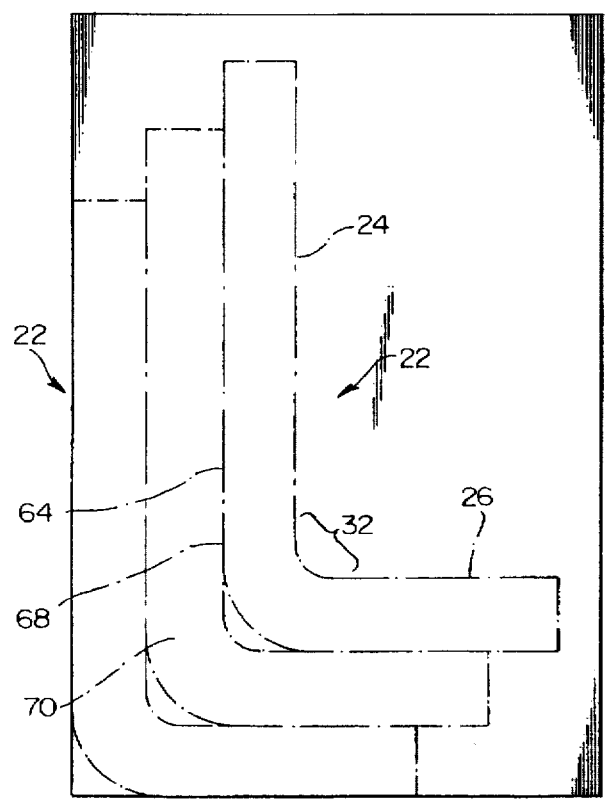
FIG. 5 is a side plan view showing low the preferred embodiment of the present invention is torch cut from a thicker metal into any desired configuration.

It can be seen therefore in FIG. 5 that to produce the blade 22 of the present invention is a simple and inexpensive procedure. In practice, the blades 22 of the present invention are very simply torch cut from a sheet of one and one half inch metal, although any suitable width and type of metal can be used. In the preferred embodiment of the present invention the blade 22 formed is at least 5/16 inch thick, thus providing a thicker and more substantial blade capable of cutting thicker and heavier brush. Also, in the preferred embodiment, with a ninety degree angle 32 cut between the stem 24 and floor 26 of the blade 22, a number of blades 22 are easily cut from the same piece of metal. Also, as seen in FIG. 5, the back 64 of one blade 66 provides the front 68 for the next blade 70 to be cut thereby assuring little waste and a minimum of torch cuts to provide the most blades 22.

From the foregoing it can be seen that the applicant's invention provides an improved blade for a flail type brush cutting machine that is formed of heavy metal and thereby cuts heavier brush; the blade provides a ninety degree angle between the stem and the floor of the blade to insure a close cut of the brush with greater integrity and less breakage of the blade; a resharpenable and renewable cutting edge on the blade is provided to reduce maintenance and replacement costs and improve the efficiency of the blade; and an attaching means in the form of an attaching hole for attaching the blade to a hanger is provided in any desired shape for easy and efficient attachment of the blade to the flail cutter. There has been accomplished by the applicant's invention all of the objects and advantages of the invention. Nevertheless, variation in the structure of the invention and the arrangement of the various parts are within the spirit and scope of the applicant's invention. The embodiments given have been given only by way of illustration and the applicant is not to be limited to the embodiments shown and described.

Having described my invention, I claim:

1. A method for producing a blade for a flail brush cutting machine comprising the steps of:
    a) providing a metal member;
    b) torch cutting the metal member to form a floor of the blade extending generally horizontally in parallel relationship to a ground surface, the floor having a cutting edge;
    c) further torch cutting the metal member to form a stem of the blade integral with the floor of the blade, the stem extending generally vertically at any angle from the floor of the blade, the stem having an attaching means for attaching the blade to a flail cutter; and whereby the cutting edge on the floor of the blade is disposed on the same plane and even with the brush to be cut, and whereby more than one blade may be integrally formed together in a one piece unit by the torch cut process.

2. The method for producing a blade for a flail cutting machine as defined in claim 1 wherein:
    the attaching means is a hole in the stem of the blade for attaching the blade to a flail cutter.

3. The method for producing a blade for a flail cutting machine as defined in claim 1 wherein the angle between the stem and floor of the blade is less than one hundred eight degrees.

4. The method for producing a blade for a frail brush cutting machine as defined in claim 1 further comprising the step of:
    d) re-torch cutting the cutting edge on the floor of the blade to a cutting edge different than the cutting edge originally torch cut.

5. The method for producing a blade for a flail brush cutting machine as defined in claim 1 wherein:
    the attaching hole in the stem of the blade is generally elliptical; and,
    whereby the blade can easily slide on a hanger to thereby flail freely.

6. The method for producing a blade for a flail brush cutting machine as defined in claim 2 wherein:
    the attaching hole in the stem is generally circular.

7. The method for producing a blade for a flail brush cutting machine as defined in claim 5 further comprising the step of:
    torch cutting the generally elliptical hole in the stem.

8. The method for producing a blade for a flail brush cutting machine as defined in claim 2 further comprising the step of:
    torch cutting the generally circular hole in the stem.

9. The method for producing a blade for a flail brush cutting machine as defined in claim 1 wherein the stem and floor are torch cut to form a blade that is at least 5/16 inch thick.

10. The method for producing a blade for a flail brush cutting machine as defined in claim 1 further comprising the step of:
    a) re-torch cutting the edge on the floor of the blade;
    whereby the cutting edge is resharpenable and renewable by repeat torch cutting.

11. A method for producing a blade for a flail brush cutting machine comprising the steps of:
    a) providing a metal member;
    b) casting the metal member to form a floor of the blade extending generally horizontally in parallel relationship to a ground surface, the floor having a cutting edge;
    c) further casting the metal member to form a stem of the blade integral with the floor of the blade, the stem extending generally at a 90degree angle from the floor of the blade, the stem having an attaching means for attaching the blade to a flail cutter; and
    whereby the cutting edge on the floor of the blade is disposed on the same plane and even with the brush to be cut, and whereby more than one blade may be integrally formed together in a one piece unit by the cast process.

* * * * *